United States Patent
Li

(10) Patent No.: US 11,950,135 B2
(45) Date of Patent: Apr. 2, 2024

(54) DATA TRANSMISSION METHOD AND DEVICE

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 371 days.

(21) Appl. No.: 17/417,717

(22) PCT Filed: Dec. 25, 2018

(86) PCT No.: PCT/CN2018/123526
§ 371 (c)(1),
(2) Date: Jun. 23, 2021

(87) PCT Pub. No.: WO2020/132874
PCT Pub. Date: Jul. 2, 2020

(65) Prior Publication Data
US 2022/0078667 A1    Mar. 10, 2022

(51) Int. Cl.
*H04W 72/04* (2023.01)
*H04W 28/06* (2009.01)
*H04W 72/0446* (2023.01)

(52) U.S. Cl.
CPC ..... *H04W 28/065* (2013.01); *H04W 72/0446* (2013.01)

(58) Field of Classification Search
CPC ... H04L 5/0044; H04L 5/0078; H04L 5/0094; H04W 28/065; H04W 72/0446
See application file for complete search history.

(56) References Cited

U.S. PATENT DOCUMENTS

| | | | |
|---|---|---|---|
| 5,537,414 A | 7/1996 | Takiyasu | |
| 2015/0372717 A1* | 12/2015 | Schrum, Jr. | H04B 3/544 370/458 |
| 2016/0286559 A1* | 9/2016 | Abedini | H04W 52/58 |

FOREIGN PATENT DOCUMENTS

| | | |
|---|---|---|
| CN | 108632326 A | 10/2018 |
| WO | WO 2017164668 A1 | 9/2017 |
| WO | WO 2018084202 A1 | 5/2018 |

OTHER PUBLICATIONS

European Patent Application No. 18944408.6 Search and Opinion dated Jun. 24, 2022, pages.

(Continued)

*Primary Examiner* — Phuc H Tran
(74) *Attorney, Agent, or Firm* — COZEN O'CONNOR

(57) ABSTRACT

A data transmission method and device includes, when the target length of a time-domain resource required by a target transmission block is greater than a first length of an available time-domain resource of a target time slot, the network access device determines a size of a first transmission sub-block transmitted on the available time-domain resource of the target time slot, divides the target transmission block into the first and second transmission sub-blocks according to the size of the first transmission sub-block, in which a second length of a time-domain resource required by the second transmission sub-block is equal to the difference between the target length and the first length, determines a first time-domain resource configured to transmit the second transmission sub-block in the next time slot after the target time slot according to the second length, and sends a first resource allocation message to a terminal.

11 Claims, 6 Drawing Sheets

(56) References Cited

OTHER PUBLICATIONS

PCT/CN2018/123526 English translation fo the International Search Report dated Sep. 16, 2019, 2 pages.
Indian Patent Application No. 202147030300 Office Action dated Mar. 3, 2022, 7 pages.

* cited by examiner

DATA TRANSMISSION METHOD AND DEVICE

This application is the US national phase application of International Application No. PCT/CN2018/123526, filed on Dec. 25, 2018, the entire contents of which are incorporated herein by reference.

TECHNICAL FIELD

The disclosure relates to the field of wireless communication technologies, in particular to a data transmission method and a data transmission device.

BACKGROUND

Different service types have different service quality requirements for wireless communication technologies, for example, enhanced Mobile Broad Band (eMBB) services mainly require large bandwidth and high speed, Ultra Reliable Low Latency Communication (URLLC) services mainly require high reliability and low latency, and massive machine type of communication (mMTC) service mainly require a large number of connections. Therefore, wireless communication systems of new generation require flexible and configurable designs to support transmission of multiple service types. For example, for URLLC services and eURLLC services of high-reliability and low-latency, end-to-end latency is required to reach 0.5 ms.

In related arts, in resource scheduling of physical downlink shared channel (PDSCH)/physical uplink shared channel (PUSCH), a symbol number at the beginning of the PDSCH is recorded as S, and the length of the PDSCH time-domain resource is recorded as L. Moreover, S and L are indicated by SLIV parameters, that is, the SLIV parameters represent the values of S and L, in which $0 < L \leq 14-S$. The values of the SLIV parameters are notified to a terminal by a network-side device through control signaling. According to the values of the SLIV parameters, the terminal may determine the symbol number S at the beginning of the PDSCH and the length of the PDSCH time-domain resource. However, in related arts, a transmission burst cannot cross an edge of slot. If resources in the current slot cannot meet data transmission needs of the user's service, transmission is performed only when the next slot has sufficient symbols available. For example, if the transmission requires 7 symbols and there are not 7 symbols in the current slot for transmission, the transmission has to wait until the next slot, which obviously increases the waiting latency and increases the transmission latency. This makes it difficult to meet high reliability and low latency requirements and seriously affects the quality of service, especially for services such as URLLC service and eURLLC service that require high transmission reliability and low transmission latency.

SUMMARY

Embodiments of a first aspect of the disclosure provide a data transmission method. The method is applied to a network access device. The method includes: determining a size of a first transmission sub-block sent on an available time-domain resource of a target time slot, when a target length of a time-domain resource required by a target transmission block is greater than a first length of the available time-domain resource of the target time slot; dividing the target transmission block into the first transmission sub-block and a second transmission sub-block based on the size of the first transmission sub-block, in which a second length of a time-domain resource required by the second transmission sub-block is equal to a difference between the target length and the first length; determining a first time-domain resource for sending the second transmission sub-block in the next time slot after the target time slot based on the second length of the time-domain resource required by the second transmission sub-block; and sending a first resource allocation message to a terminal, in which the first resource allocation message includes the size of the first transmission sub-block, first indication information representing the available time-domain resource of the target time slot configured to send the first transmission sub-block, and second indication information of the first time-domain resource configured to send the second transmission sub-block in the next time slot after the target time slot.

Embodiments of a second aspect of the disclosure provide a data transmission method. The method is applied to a terminal. The method includes: receiving a first resource allocation message sent by a network access device, in which the first resource allocation message includes a size of a first transmission sub-block, first indication information representing an available time-domain resource of a target time slot configured to send the first transmission sub-block, and second indication information of a first time-domain resource configured to send a second transmission sub-block in the next time slot after the target time slot; dividing a target transmission block into the first transmission sub-block and the second transmission sub-block based on the size of the first transmission sub-block and a size of the target transmission block, in which a size of the second transmission sub-block is equal to a difference between the size of the target transmission block and the size of the first transmission sub-block; and sending the first transmission sub-block on the available time-domain resource of the target time slot, and sending the second transmission sub-block on the first time-domain resource configured to send the second transmission sub-block in the next time slot after the target time slot.

Embodiments of a third aspect of the disclosure provide a data transmission device. The device includes a processor and a memory configured to store instructions executable by the processor. The processor is configured to: determine a size of a first transmission sub-block sent on an available time-domain resource of a target time slot, when a target length of a time-domain resource required by a target transmission block is greater than a first length of the available time-domain resource of the target time slot; divide the target transmission block into the first transmission sub-block and a second transmission sub-block based on the size of the first transmission sub-block, in which a second length of a time-domain resource required by a second transmission sub-block is equal to a difference between the target length and the first length; determine a first time-domain resource for sending the second transmission sub-block in the next time slot after the target time slot based on the second length of the time-domain resource required by the second transmission sub-block; and send a first resource allocation message to a terminal, in which the first resource allocation message includes the size of the first transmission sub-block, first indication information representing the available time-domain resource of the target time slot configured to send the first transmission sub-block, and second indication information of the first time-domain resource configured to send the second transmission sub-block in the next time slot after the target time slot.

Embodiments of a fourth aspect of the disclosure provide a data transmission device. The device includes a processor and a memory configured to store instructions executable by the processor. The processor is configured to: receive a first resource allocation message sent by a network access device, in which the first resource allocation message includes a size of a first transmission sub-block, first indication information representing an available time-domain resource of a target time slot configured to send the first transmission sub-block, and second indication information of a first time-domain resource configured to send a second transmission sub-block in the next time slot after the target time slot; divide a target transmission block into the first transmission sub-block and the second transmission sub-block based on the size of the first transmission sub-block and a size of the target transmission block, in which a size of the second transmission sub-block is equal to a difference between the size of the target transmission block and the size of the first transmission sub-block; and send the first transmission sub-block on the available time-domain resource of the target time slot, and send the second transmission sub-block on the first time-domain resource configured to send the second transmission sub-block in the next time slot after the target time slot.

Embodiments of a fifth aspect of the disclosure provide a computer-readable storage medium having computer instructions stored thereon. When the instructions are executed by a processor, the method according to the embodiments of the first aspect is implemented.

Embodiments of a sixth aspect of the disclosure provide a computer-readable storage medium having computer instructions stored thereon. When the instructions are executed by a processor, the method according to the embodiments of the second aspect is implemented.

It should be understood that the above general description and the following detailed description are only exemplary and explanatory, and do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
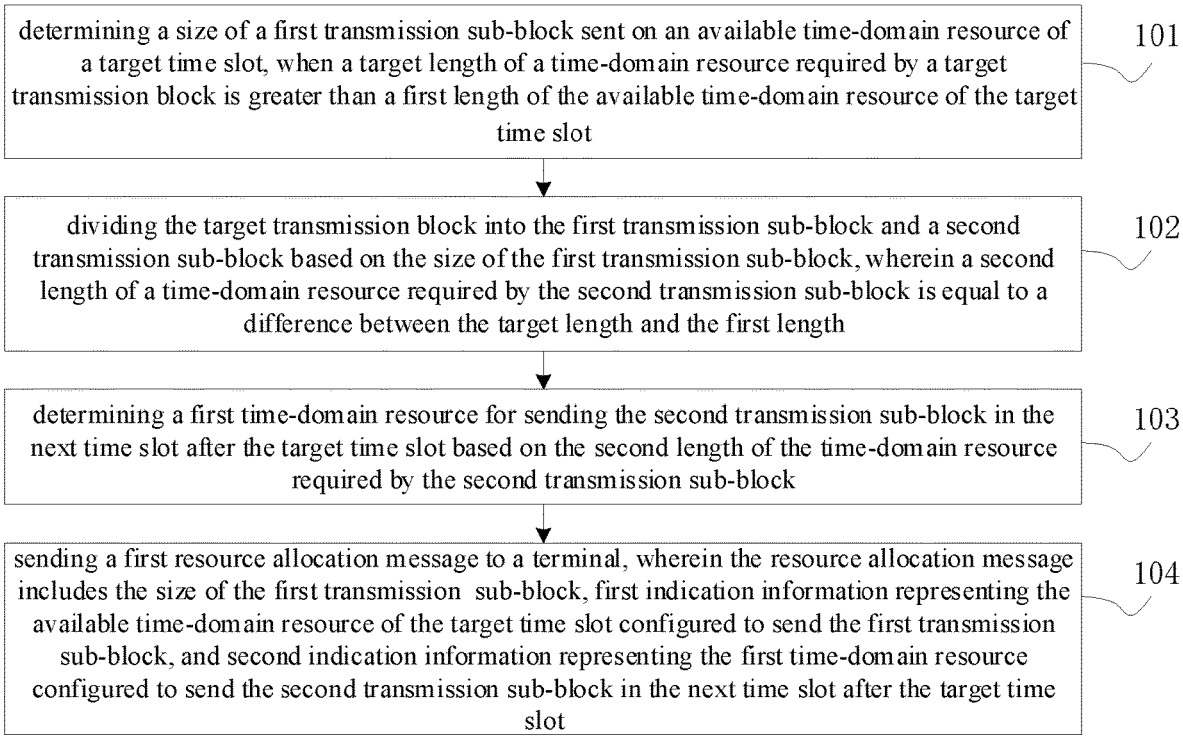
FIG. 1 is a flowchart of a data transmission method according to an embodiment.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Embodiments of the disclosure provide a data transmission method. The method is applied to a network access device. The method includes: determining a size of a first transmission sub-block sent on an available time-domain resource of a target time slot, when a target length of a time-domain resource required by a target transmission block is greater than a first length of the available time-domain resource of the target time slot; dividing the target transmission block into the first transmission sub-block and a second transmission sub-block based on the size of the first transmission sub-block, in which a second length of a time-domain resource required by a second transmission sub-block is equal to a difference between the target length and the first length; determining a first time-domain resource for sending the second transmission sub-block in the next time slot after the target time slot based on the second length of the time-domain resource required by the second transmission sub-block; and sending a first resource allocation message to a terminal, in which the first resource allocation message includes the size of the first transmission sub-block, first indication information representing the available time-domain resource of the target time slot configured to send the first transmission sub-block, and second indication information of the first time-domain resource configured to send the second transmission sub-block in the next time slot after the target time slot. In the data transmission method according to embodiments of the disclosure, the target transmission block is divided into the first transmission sub-block and the second transmission sub-block when the available time-domain resource in the target time slot cannot satisfy burst transmission. The first transmission sub-block is sent on the available time-domain resource of the target time slot, and the second transmission sub-block is sent on the next time slot of the target time slot, so that the target transmission block does not need to be transmitted until the next time slot has a sufficient number of continuous symbols, which reduces waiting latency and transmission latency, thereby ensuring high reliability and low latency of service, and improving service quality.

It should be noted that the data transmission method according to embodiments of the disclosure may be applied to a 3G/4G/5G communication network. The terminal in the disclosure may for example include electronic devices, such as smart phones, in-vehicle devices, smart home appliances, notebooks, or smart wearable devices. The network access device in the disclosure may include, for example, communication devices that provide wireless access services for the terminal, such as a base station or a relay station.

Based on the above analysis, the following specific embodiments are proposed.

FIG. 1 is a flowchart of a data transmission method according to an embodiment. The execution subject of the data transmission method may be a network access device. As illustrated in FIG. 1, the method includes steps 101-104.

At step 101, a size of a first transmission sub-block sent on an available time-domain resource of a target time slot is determined, when a target length of a time-domain resource required by a target transmission block is greater than a first length of the available time-domain resource of the target time slot.

For example, before step 101, the method further includes: determining the size of the target transmission block according to buffer information of the data to be sent; determining a modulation mode and a code rate used in physical layer resource mapping based on state information of a physical channel; and determining the target length of the time-domain resource required by the target transmission block based on the size of the target transmission block, the modulation mode and the code rate used in physical layer resource mapping.

For example, at step 101, determining the size of the first transmission sub-block sent on the available time-domain resource of the target time slot includes: determining the size of the first transmission sub-block based on the first length of the available time-domain resource of the target time slot, the size of an available frequency-domain resource, and the modulation mode and the code rate used in physical layer resource mapping.

At step 102, the target transmission block is divided into the first transmission sub-block and a second transmission sub-block based on the size of the first transmission sub-block, in which a second length of a time-domain resource required by a second transmission sub-block is equal to a difference between the target length and the first length.

For example, the size of the second transmission sub-block is equal to the difference between the size of the target transmission block and the size of the first transmission sub-block.

At step 103, a first time-domain resource for sending the second transmission sub-block in the next time slot after the target time slot is determined based on the second length of the time-domain resource required by the second transmission sub-block.

At step 104, a first resource allocation message is sent to a terminal, the first resource allocation message including the size of the first transmission sub-block, first indication information representing the available time-domain resource of the target time slot configured to send the first transmission sub-block, and second indication information of the first time-domain resource configured to send the second transmission sub-block in the next time slot after the target time slot.

For example, for downlink data transmission, when the network access device determines that the target length of the time-domain resource required to transmit the target transmission block in the burst transmission is greater than the first length of the available time-domain resource of the target time slot, the size of the first transmission sub-block to be sent on the available time-domain resource of the target time slot is determined. According to the size of the first transmission sub-block, the target transmission block is divided into the first transmission sub-block and the second transmission sub-block. The second length of the time-domain resource required by the second transmission sub-block is equal to the difference between the target length and the first length. According to the second length of the time-domain resource required by the second transmission sub-block, the first time-domain resource configured to send the second transmission sub-block in the next time slot after the target time slot is determined. The network access device sends the first resource allocation message to the terminal. The first resource allocation message includes the size of the first transmission sub-block, the first indication information representing the available time-domain resource of the target time slot configured to send the first transmission sub-block, and the second indication information of the first time-domain resource configured to send the second transmission sub-block in the next time slot after the target time slot. The network access device sends the first transmission sub-block on the available time-domain resource of the target time slot, and sends the second transmission sub-block on the first time-domain resource configured to send the second transmission sub-block in the next time slot after the target time slot. The terminal receives the first transmission sub-block on the available time-domain resource of the target time slot, and receives the second transmission sub-block on the first time-domain resource of the next time slot after the target time slot.

With the technical solution provided by embodiments of the disclosure, the target transmission block is divided into the first transmission sub-block and the second transmission sub-block when the available time-domain resource in the target time slot cannot satisfy burst transmission. The first transmission sub-block is sent on the available time-domain resource of the target time slot, and the second transmission sub-block is sent on the next time slot of the target time slot, so that there is no need to wait until the next time slot has a sufficient number of continuous symbols to start transmitting the target transmission block, which reduces waiting latency and transmission latency, thereby ensuring high reliability and low latency of service, and improving service quality.

In an embodiment, the first indication information includes the first length and a number of a first start symbol of the available time-domain resource of the target time slot, and the second indication information includes the second length and a number of a second start symbol of the first time-domain resource configured to transmit the second transmission sub-block in the next time slot after the target time slot.

Taking the uplink data transmission as an example, the network access device directly notifies the first length and the number of the first start symbol of the available time-domain resource of the target time slot of the first transmission sub-block, and the second length and the number of the second start symbol of the first time-domain resource configured to send the second transmission sub-block on the next time slot of the target time slot to the terminal through the first resource allocation message. For example, in the first resource allocation message, 4 bits are used to represent the number of the first start symbol, 4 bits are used to represent the first length, and 4 bits are used to represent the number of the second start symbol of the first time-domain resource in the next time slot of the target time slot, and 4 bits are used to represent the second length.

By parsing the first resource allocation message, the terminal directly learns the size of the first transmission sub-block, the first length and the number of the first start symbol of the available time-domain resource of the target time slot configured to send the first transmission sub-block, and the second length and the number of the second start symbol of the first time-domain resource configured to transmit the second transmission sub-block in the next time slot after the target time slot. The terminal divides the target transmission block into the first transmission sub-block and the second transmission sub-block according to the size of the target transmission block and the size of the first transmission sub-block, sends the first transmission sub-block on the available time-domain resource of the target time slot, and sends the second transmission sub-block on the first time-domain resource configured to send the second transmission sub-block on the next time slot after the target time slot.

With the technical solution of the embodiments of the disclosure, through issuing the first resource allocation message, the network access device directly notifies the first length and the number of the first start symbol of the available time-domain resource of the target time slot, and the second length and the number of the second start symbol of the first time-domain resource in the next time slot of the target time slot to the terminal. The network access device does not need to calculate and issue L and S indicators, such as SLIV, which overcomes the limitation in the related art that a sum of the number and the length of the start symbol of the time-domain resource cannot exceed 14, so that the target transmission block does not need to be transmitted until the next time slot has a sufficient number of continuous symbols, which reduces the waiting latency and the transmission delay.

In an embodiment, the first indication information includes a first indicator value and determination information, and the second indication information includes a second indicator value. Before step 104, the method further includes step A1 and step A2.

At step A1, the first indicator value and the determination information indicating whether the number of the first start symbol is greater than a preset value are determined according to the first length and the number of the first start symbol of the available time-domain resource of the target time slot.

At step A2, the second indicator value is determined according to the second length and the number of the second start symbol of the first time-domain resource configured to transmit the second transmission sub-block in the next time slot after the target time slot.

With the technical solution of the embodiments of the disclosure, by issuing the first resource allocation message, the network access device notifies the first indicator value corresponding to the first length and the number of the first start symbol of the available time-domain resource of the target time slot, and the second indicator value corresponding to the second length and the number of the second start symbol of the first time-domain resource in the next time slot after the target time slot to the terminal, while notifying the determination information indicating whether the number of the first start symbol is greater than the preset value to the terminal. Without the limitation in the related art that the sum of the number and the length of the start symbol of the time-domain resource cannot exceed 14, the terminal can accurately know the first length and the number of the first start symbol of the available time-domain resource of the target time slot based on the first indicator value and the determination information indicating whether the number of the first start symbol is greater than the preset value. Therefore, it is not necessary to start transmitting the target transmission block until the next time slot has a sufficient number of continuous symbols, which reduces the waiting latency and the transmission delay.

Figure 2:
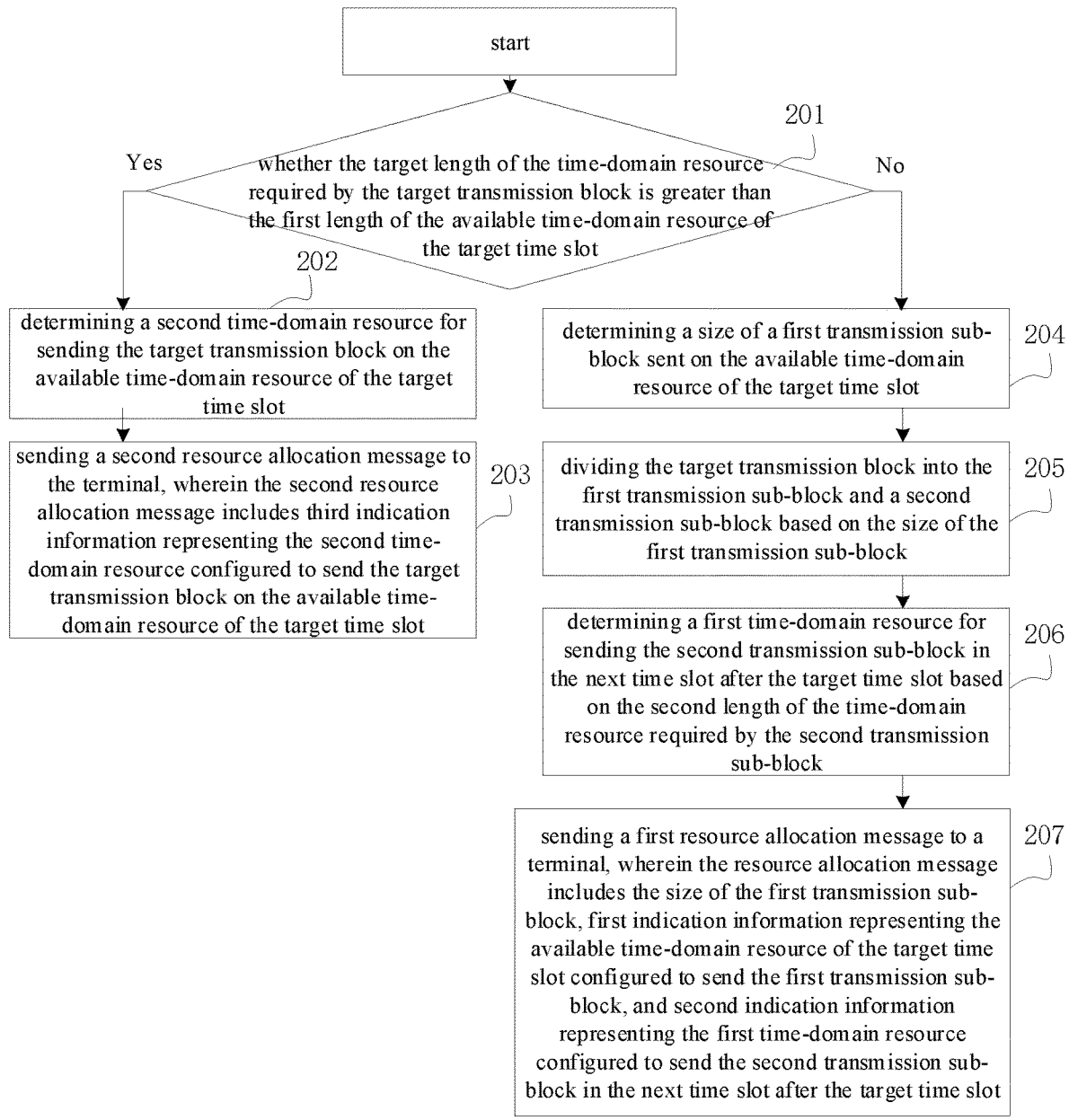
FIG. 2 is a flowchart of a data transmission method according to an embodiment.

FIG. 2 is a flowchart of a data transmission method according to an embodiment. The execution subject of the data transmission method may be a network access device. As illustrated in FIG. 2, the method includes the following steps 201-207.

At step 201, it is determined whether the target length of the time-domain resource required by the target transmission block is greater than the first length of the available time-domain resource of the target time slot. When it is determined that the target length of the time-domain resource required by the target transmission block is greater than the first length of the available time-domain resource of the target time slot, step 202 is executed. When it is determined that the target length of the time-domain resource required by the target transmission block is not greater than the first length of the available time-domain resource of the target time slot, step 204 is executed.

At step 202, a second time-domain resource for sending the target transmission block on the available time-domain resource of the target time slot is determined.

At step 203, a second resource allocation message is sent to the terminal, the second resource allocation message including third indication information representing the second time-domain resource configured to send the target transmission block on the available time-domain resource of the target time slot.

At step 204, a size of a first transmission sub-block sent on the available time-domain resource of the target time slot is determined.

At step 205, the target transmission block is divided into the first transmission sub-block and a second transmission sub-block based on the size of the first transmission sub-block. A second length of a time-domain resource required by the second transmission sub-block is equal to a difference between the target length and the first length.

For example, the size of the second transmission sub-block is equal to the difference between the size of the target transmission block and the size of the first transmission sub-block.

At step 206, a first time-domain resource for sending the second transmission sub-block in the next time slot after the target time slot is determined based on the second length of the time-domain resource required by the second transmission sub-block.

At step 207, a first resource allocation message is sent to a terminal, the first resource allocation message including the size of the first transmission sub-block, first indication information representing the available time-domain resource of the target time slot configured to send the first transmission sub-block, and second indication information of the first time-domain resource configured to send the second transmission sub-block in the next time slot after the target time slot.

With the technical solution provided by embodiments of the disclosure, when the available time-domain resource in the target time slot cannot satisfy burst transmission, the target transmission block is divided into the first transmission sub-block and the second transmission sub-block. The first transmission sub-block is sent on the available time-domain resource of the target time slot, and the second transmission sub-block is sent on the next time slot after the target time slot, so that there is no need to start transmitting the target transmission block until the next time slot has a sufficient number of continuous symbols, which reduces waiting latency and transmission latency, thereby ensuring high service reliability and low latency, and improving service quality.

Figure 3:
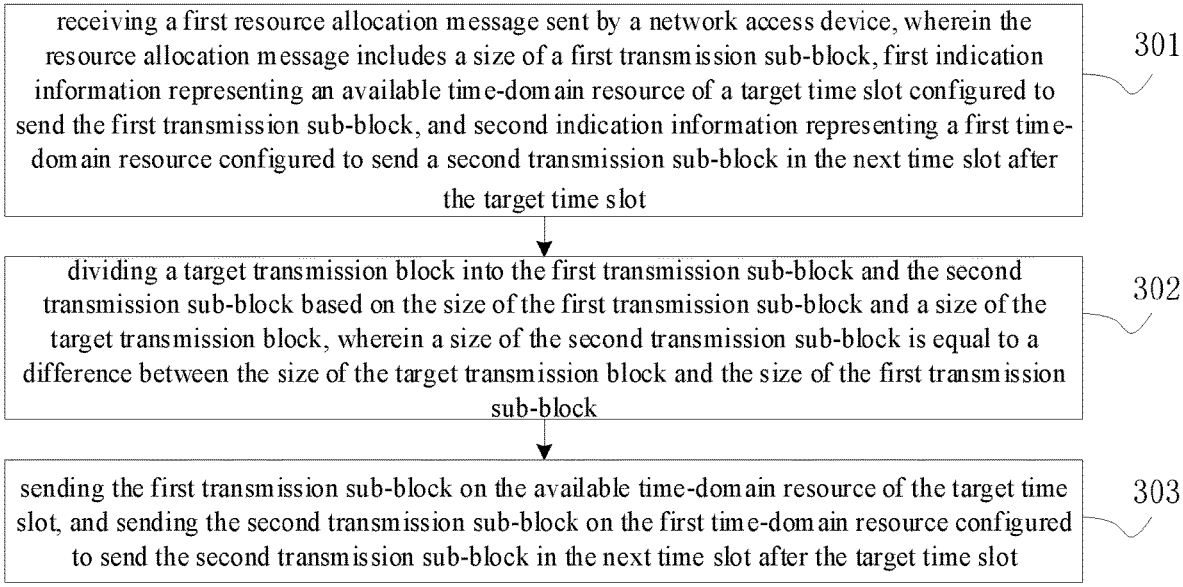
FIG. 3 is a flowchart of a data transmission method according to an embodiment.

FIG. 3 is a flowchart of a data transmission method according to an embodiment. The execution subject of the data transmission method may be a terminal. As illustrated in FIG. 3, the method includes the following steps 301-303.

At step 301, a first resource allocation message sent by a network access device is received. The first resource allocation message includes a size of a first transmission sub-block, first indication information representing an available time-domain resource of a target time slot configured to send the first transmission sub-block, and second indication information of a first time-domain resource configured to send a second transmission sub-block in the next time slot after the target time slot.

At step 302, a target transmission block is divided into the first transmission sub-block and the second transmission sub-block based on the size of the first transmission sub-block and a size of the target transmission block. A size of the second transmission sub-block is equal to a difference between the size of the target transmission block and the size of the first transmission sub-block.

At step 303, the first transmission sub-block is sent on the available time-domain resource of the target time slot, and the second transmission sub-block is sent on the first time-domain resource configured to send the second transmission sub-block in the next time slot after the target time slot.

With the technical solution of the embodiments of the disclosure, when the available time-domain resource in the target time slot cannot satisfy burst transmission, the target transmission block is divided into the first transmission sub-block and the second transmission sub-block. The first transmission sub-block is sent on the available time-domain resource of the target time slot, and the second transmission sub-block is sent on the next time slot after the target time slot, so that there is no need to wait until the next time slot has a sufficient number of continuous symbols and then start transmitting the target transmission block, which reduces waiting latency and transmission latency, thereby ensuring high service reliability and low latency, and improving service quality.

In an embodiment, the first indication information includes the first length and the number of the first start symbol of the available time-domain resource of the target time slot, and the second indication information includes the second length and the number of the second start symbol of the first time-domain resource configured to transmit the second transmission sub-block in the next time slot after the target time slot.

In an embodiment, the first indication information includes a first indicator value and determination information, and the second indication information includes a second indicator value. After step 301, the method further includes step B1 and step B2.

At step B1, the first length and the number of the first start symbol of the available time-domain resource of the target time slot are determined according to the first indicator value and the determination information.

At step B2, the second length and the number of the second start symbol of the first time-domain resource configured to transmit the second transmission sub-block in the next time slot after the target time slot is determined based on the second indicator value.

With the technical solution of the embodiments of the disclosure, by issuing the first resource allocation message, the network access device notifies the first indicator value corresponding to the first length and the number of the first start symbol of the available time-domain resource of the target time slot, and the second indicator value corresponding to the second length and the number of the second start symbol of the first time-domain resource in the next time slot after the target time slot to the terminal, while notifying the determination information indicating whether the number of the first start symbol is greater than the preset value to the terminal. Without the limitation in the related art that the sum of the number and the length of the start symbol of the time-domain resource cannot exceed 14, the terminal can accurately know the first length and the number of the first start symbol of the available time-domain resource of the target time slot based on the first indicator value and the determination information indicating whether the number of the first start symbol is greater than the preset value. Therefore, it is not necessary to start transmitting the target transmission block until the next time slot has a sufficient number of continuous symbols, which reduces the waiting latency and the transmission delay.

The following are device embodiments of the present disclosure, which may be configured to implement the method embodiments of the disclosure.

Figure 4:
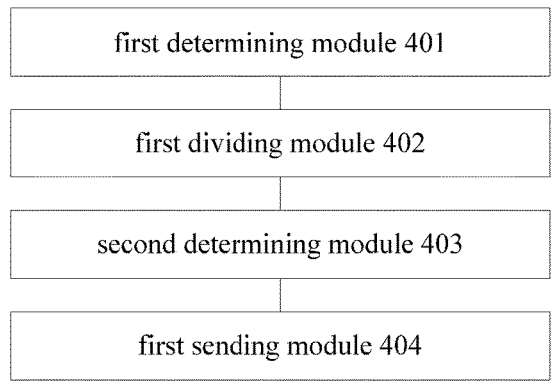
FIG. 4 is a block diagram of a data transmission device according to an embodiment.

FIG. 4 is a block diagram of a data transmission device according to an embodiment. The device may be applied to a network access device. As illustrated in FIG. 4, the data transmission device includes: a first determining module 401, a first dividing module 402, a second determining module 403, and a first sending module 404.

The first determining module 401 is configured to determine a size of a first transmission sub-block sent on an available time-domain resource of a target time slot, when a target length of a time-domain resource required by a target transmission block is greater than a first length of the available time-domain resource of the target time slot.

The first dividing module 402 is configured to divide the target transmission block into the first transmission sub-block and a second transmission sub-block based on the size of the first transmission sub-block, in which a second length of a time-domain resource required by the second transmission sub-block is equal to a difference between the target length and the first length.

The second determining module 403 is configured to determine a first time-domain resource for sending the second transmission sub-block in the next time slot after the target time slot based on the second length of the time-domain resource required by the second transmission sub-block.

The first sending module 404 is configured to send a first resource allocation message to a terminal, in which the first resource allocation message includes the size of the first transmission sub-block, first indication information representing the available time-domain resource of the target time slot configured to send the first transmission sub-block, and second indication information representing the first time-domain resource configured to send the second transmission sub-block in the next time slot after the target time slot.

With the device provided by embodiments of the disclosure, when the available time-domain resource in the target time slot cannot satisfy burst transmission, the target transmission block is divided into the first transmission sub-block and the second transmission sub-block. The first transmission sub-block is sent on the available time-domain resource of the target time slot, and the second transmission sub-block is sent on the next time slot after the target time slot, so that there is no need to wait until the next time slot has a sufficient number of continuous symbols and then start transmitting the target transmission block, which reduces waiting latency and transmission latency, thereby ensuring high service reliability and low latency, and improving service quality.

In an embodiment, the first indication information includes the first length and a number of a first start symbol of the available time-domain resource of the target time slot, and the second indication information includes the second length and a number of a second start symbol of the first time-domain resource configured to transmit the second transmission sub-block in the next time slot after the target time slot.

Figure 5:
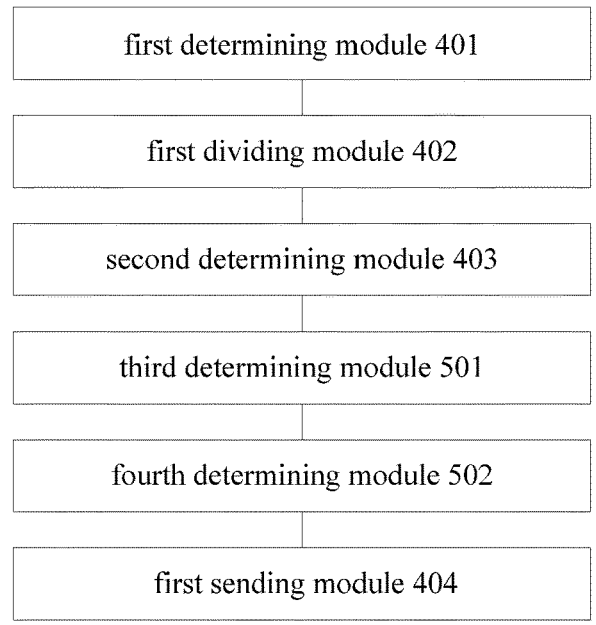
FIG. 5 is a block diagram of a data transmission device according to an embodiment.

In an embodiment, the first indication information includes a first indicator value and determination information, and the second indication information includes a second indicator value. As illustrated in FIG. 5, the data transmission device shown in FIG. 4 may further include: a third determining module 501 and a fourth determining module 502.

The third determining module 501 is configured to determine the first indicator value and the determination information indicating whether the number of the first start symbol is greater than a preset value according to the first length and the number of the first start symbol of the available time-domain resource of the target time slot.

The fourth determining module 502 is configured to determine the second indicator value according to the second length and the number of the second start symbol of the first time-domain resource configured to transmit the second transmission sub-block in the next time slot after the target time slot.

Figure 6:
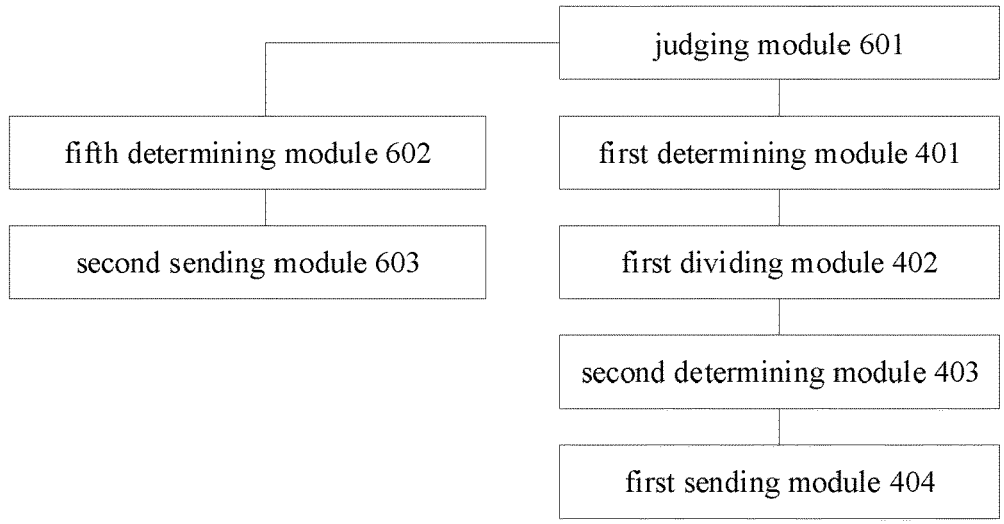
FIG. 6 is a block diagram of a data transmission device according to an embodiment.

In an embodiment, as illustrated in FIG. 6, the data transmission device shown in FIG. 4 may further include: a judging module 601, a fifth determining module 602, and a second sending module 603.

The judging module 601 is configured to determine whether the target length of the time-domain resource required by the target transmission block is greater than the first length of the available time-domain resource of the target time slot.

The fifth determining module 602 is configured to determine a second time-domain resource for sending the target transmission block on the available time-domain resource of the target time slot, when the target length of the time-domain resource required by the target transmission block is greater than the first length of the available time-domain resource of the target time slot.

The second sending module 603 is configured to send a second resource allocation message to the terminal, in which the second resource allocation message includes third indication information representing the second time-domain resource configured to send the target transmission block on the available time-domain resource of the target time slot.

Figure 7:
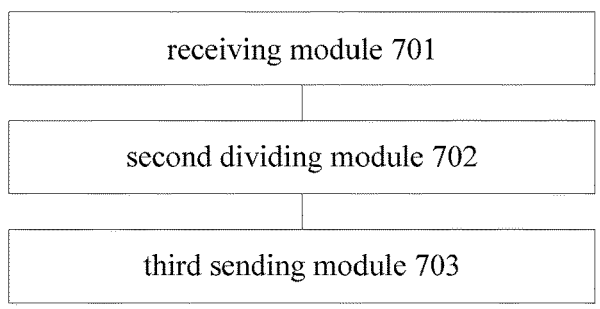
FIG. 7 is a block diagram of a data transmission device according to an embodiment.

FIG. 7 is a block diagram of a data transmission device according to an embodiment. The device may be applied to a terminal. As illustrated in FIG. 7, the data transmission device includes: a receiving module 701, a second dividing module 702, and a third sending module 703.

The receiving module 701 is configured to receive a first resource allocation message sent by a network access device. The first resource allocation message includes a size of a first transmission sub-block, first indication information representing an available time-domain resource of a target time slot configured to send the first transmission sub-block, and second indication information representing a first time-domain resource configured to send a second transmission sub-block in the next time slot after the target time slot.

The second dividing module 702 is configured to divide a target transmission block into the first transmission sub-block and a second transmission sub-block based on the size of the first transmission sub-block and a size of the target transmission block, in which a size of the second transmission sub-block is equal to a difference between the size of the target transmission block and the size of the first transmission sub-block.

The third sending module 703 is configured to send the first transmission sub-block on the available time-domain resource of the target time slot, and send the second transmission sub-block on the first time-domain resource configured to send the second transmission sub-block in the next time slot after the target time slot.

With the technical solution provided by embodiments of the disclosure, the target transmission block is divided into the first transmission sub-block and the second transmission sub-block when the available time-domain resource in the target time slot cannot satisfy burst transmission. The first transmission sub-block is sent on the available time-domain resource of the target time slot, and the second transmission sub-block is sent in the next time slot after the target time slot, so that the target transmission block does not need to be transmitted until the next time slot has a sufficient number of continuous symbols, which reduces waiting latency and transmission latency, thereby ensuring high service reliability and low latency, and improving service quality.

In an embodiment, the first indication information includes the first length and a number of a first start symbol of the available time-domain resource of the target time slot, and the second indication information includes the second length and a number of a second start symbol of the first time-domain resource configured to transmit the second transmission sub-block in the next time slot after the target time slot.

Figure 8:
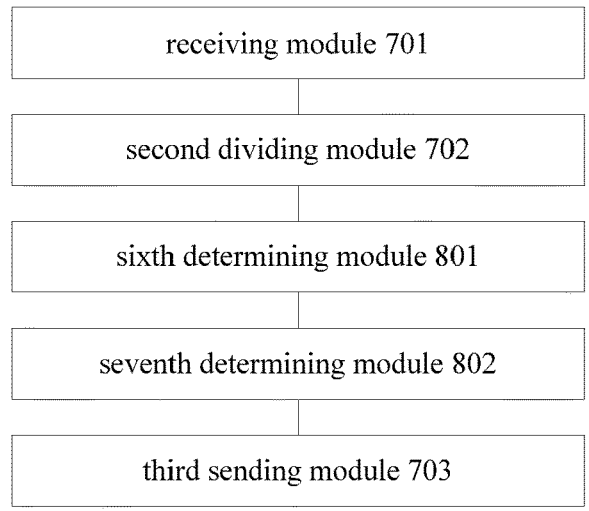
FIG. 8 is a block diagram of a data transmission device according to an embodiment.

In an embodiment, the first indication information includes a first indicator value and determination information, and the second indication information includes a second indicator value. As illustrated in FIG. 8, the data transmission device shown in FIG. 7 may further include: a sixth determining module 801 and a seventh determining module 802.

The sixth determining module 801 is configured to determine the first length and the number of the first start symbol of the available time-domain resource of the target time slot according to the first indicator value and the determination information.

The seventh determining module 802 is configured to determine the second length and the number of the second start symbol of the first time-domain resource configured to transmit the second transmission sub-block in the next time slot after the target time slot based on the second indicator value.

Figure 9:
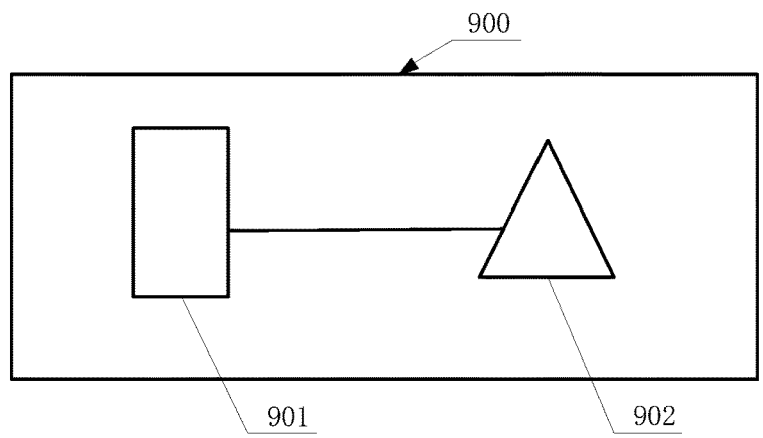
FIG. 9 is a block diagram of a data transmission device according to an embodiment.

FIG. 9 is a block diagram of a data transmission device 900 according to an embodiment. The data transmission device 900 is applied to a network access device, and the data transmission device 900 includes: a processor 901 and a memory 902 configured to store instructions executable by the processor. The processor 901 is configured to: determine a size of a first transmission sub-block sent on an available time-domain resource of a target time slot, when a target length of a time-domain resource required by a target transmission block is greater than a first length of the available time-domain resource of the target time slot; divide the target transmission block into the first transmission sub-block and a second transmission sub-block based on the size of the first transmission sub-block, in which a second length of a time-domain resource required by the second transmission sub-block is equal to a difference between the target length and the first length; determine a first time-domain resource for sending the second transmission sub-block in the next time slot after the target time slot based on the second length of the time-domain resource required by the second transmission sub-block; and send a first resource allocation message to a terminal, the first resource allocation message including the size of the first transmission sub-block, first indication information representing the available time-domain resource of the target time slot configured to send the first transmission sub-block, and second indication information representing the first time-domain resource configured to send the second transmission sub-block in the next time slot after the target time slot.

In an embodiment, the first indication information includes the first length and a number of a first start symbol of the available time-domain resource of the target time slot, and the second indication information includes the second length and a number of a second start symbol of the first time-domain resource configured to transmit the second transmission sub-block in the next time slot after the target time slot.

In an embodiment, the first indication information includes a first indicator value and determination information, and the second indication information includes a second indicator value. The processor 901 may be further configured to: determine the first indicator value and the determination information indicating whether the number of the first start symbol is greater than a preset value according to the first length and the number of the first start symbol of the available time-domain resource of the target time slot; and determine the second indicator value according to the second length and the number of the second start symbol of the first time-domain resource configured to transmit the second transmission sub-block in the next time slot after the target time slot.

In an embodiment, the processor 901 may be further configured to: determine whether the target length of the time-domain resource required by the target transmission block is greater than the first length of the available time-domain resource of the target time slot; determine a second time-domain resource for sending the target transmission block on the available time-domain resource of the target time slot, when the target length of the time-domain resource required by the target transmission block is greater than the first length of the available time-domain resource of the target time slot; and send a second resource allocation message to the terminal, in which the second resource allocation message includes third indication information representing the second time-domain resource configured to send the target transmission block on the available time-domain resource of the target time slot.

Figure 10:
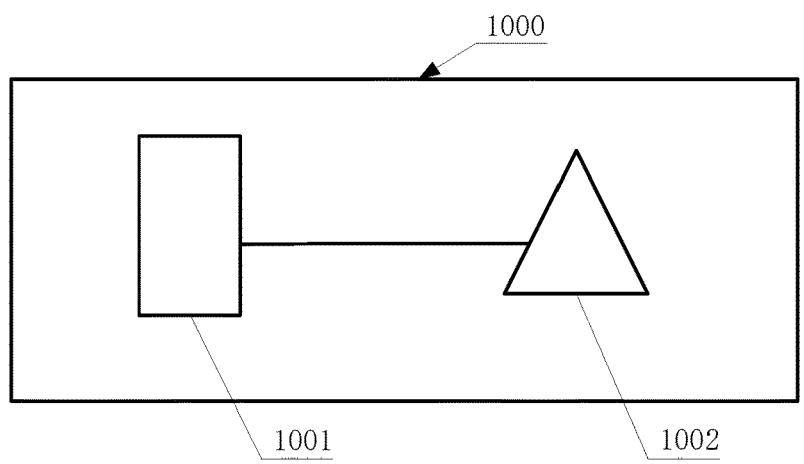
FIG. 10 is a block diagram of a data transmission device according to an embodiment.

FIG. 10 is a block diagram of a data transmission device 1000 according to an embodiment. The device is applied to a terminal. The data transmission device 1000 includes: a processor 1001 and a memory 1002 configured to store instructions executable by the processor. The processor 1001 is configured to: receive a first resource allocation message sent by a network access device, in which the first resource allocation message includes a size of a first transmission sub-block, first indication information representing an available time-domain resource of a target time slot configured to send the first transmission sub-block, and second indication information representing a first time-domain resource configured to send a second transmission sub-block in the next time slot after the target time slot; divide a target transmission block into the first transmission sub-block and a second transmission sub-block based on the size of the first transmission sub-block and a size of the target transmission block, in which a size of the second transmission sub-block is equal to a difference between the size of the target transmission block and the size of the first transmission sub-block; and send the first transmission sub-block on the available time-domain resource of the target time slot, and send the second transmission sub-block on the first time-domain resource configured to send the second transmission sub-block in the next time slot after the target time slot.

In an embodiment, the first indication information includes the first length and a number of a first start symbol of the available time-domain resource of the target time slot, and the second indication information includes the second length and a number of a second start symbol of the first time-domain resource configured to transmit the second transmission sub-block in the next time slot after the target time slot.

In an embodiment, the first indication information includes a first indicator value and determination information, and the second indication information includes a second indicator value. The processor 1001 may be further configured to: determine the first length and the number of the first start symbol of the available time-domain resource of the target time slot according to the first indicator value and the determination information; and determine the second length and a number of the second start symbol of the first time-domain resource configured to transmit the second transmission sub-block in the next time slot after the target time slot based on the second indicator value.

Regarding the device in the above embodiments, the specific manner in which each module performs operation has been described in detail in the embodiments of the method, which is not described in detail here.

Figure 11:
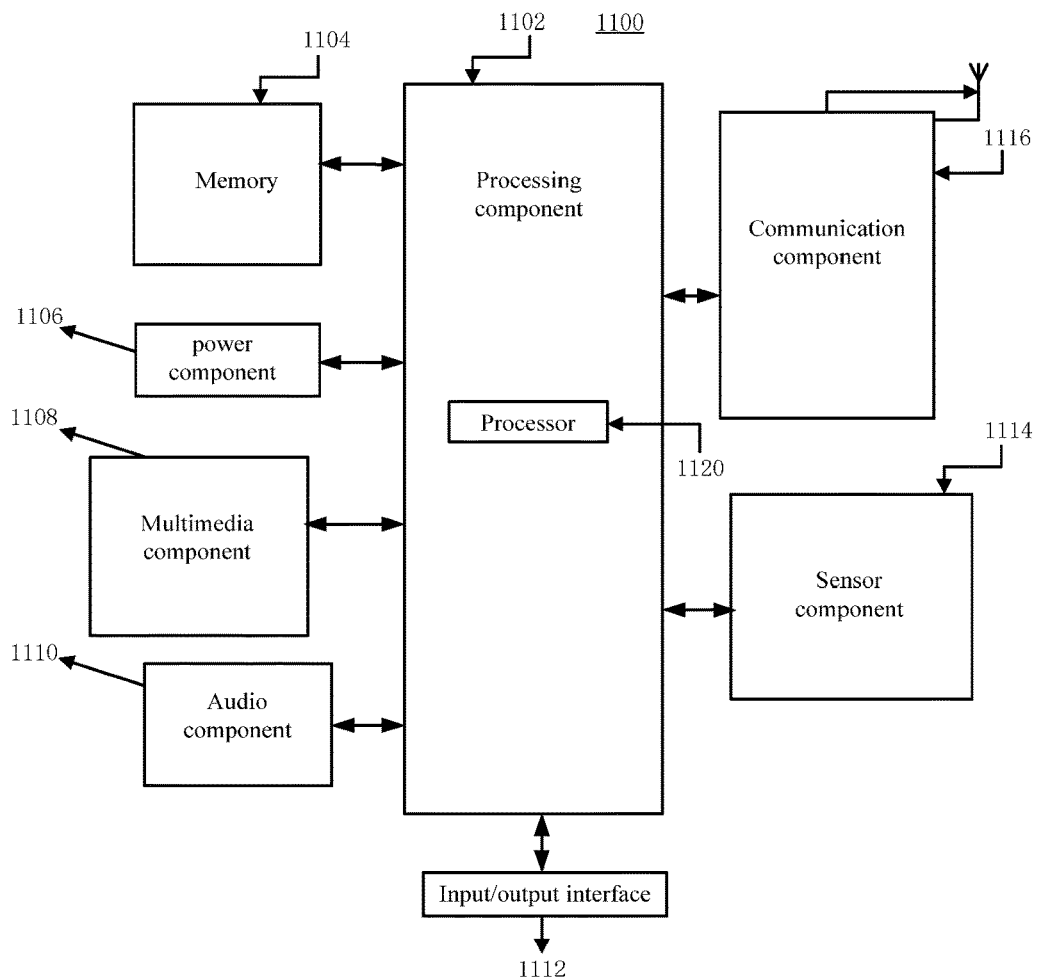
FIG. 11 is a block diagram of a data transmission device according to an embodiment.

FIG. 11 is a block diagram of a data transmission device according to an embodiment. The data transmission device 1100 is applied to a terminal. The data transmission device 1100 may include one or more of following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the data transmission device 1100, such as the operations associated with display, telephone calls, data communications, camera operations, and recording operations. The processing component 1102 may include one or more processors 1120 to execute instructions to perform all or part of the steps in the above described method. Moreover, the processing component 1102 may include one or more modules which facilitate interaction between the processing component 1102 and other components. For instance, the processing component 1102 may include a multimedia module to facilitate interaction between the multimedia component 1108 and the processing component 1102.

The memory 1104 is configured to store various types of data to support the operation of the data transmission device 1100. Examples of such data include instructions for any applications or methods operated on the data transmission device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the data transmission device 1100. The power component 1106 may include a power management system, one or more power sources, and any other components associated with the generation, management, and distribution of power in the data transmission device 1100.

The multimedia component 1108 includes a screen providing an output interface between the data transmission device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and pressure associated with the touch or swipe action. In some embodiments, the multimedia component 1108 includes a front camera and/or a rear camera. When the data transmission device 1100 is in an operation mode, such as in a shooting mode or a video mode, the front camera and/or the rear camera receives external multimedia data. Each front camera and rear camera can be a fixed optical lens system or have focal length and optical zoom capabilities.

The audio component 1110 is configured to output and/or input audio signals. For example, the audio component 1110 includes a microphone ("MIC") configured to receive an external audio signal when the data transmission device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the data transmission device 1100. For instance, the sensor component 1114 may detect an open/closed status of the data transmission device 1100, relative positioning of components, e.g., the display and the keypad, of the data transmission device 1100, a change in position of the data transmission device 1100 or a component of the data transmission device 1100, a presence or absence of user contact with the data transmission device 1100, an orientation or an acceleration/deceleration of the data transmission device 1100, and a change in temperature of the data transmission device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the data transmission device 1100 and other devices. The data transmission device 1100 can access a wireless network based on a communication standard, such as WiFi, 2G, 3G, 4G, 5G or a combination thereof, or a talkback network. In one embodiment, the communication component 1116 receives a broadcast signal or broadcast associated information from an external broadcast management system via a broadcast channel. In one embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the data transmission device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is also provided a non-transitory computer readable storage medium including instructions, such as included in the memory 1104, executable by the processor 1120 in the data transmission device 1100, for performing the above-described methods. For example, the non-transitory computer-readable storage medium may be a ROM, a RAM, a CD-ROM, a magnetic tape, a floppy disc, an optical data storage device, and the like.

Figure 12:
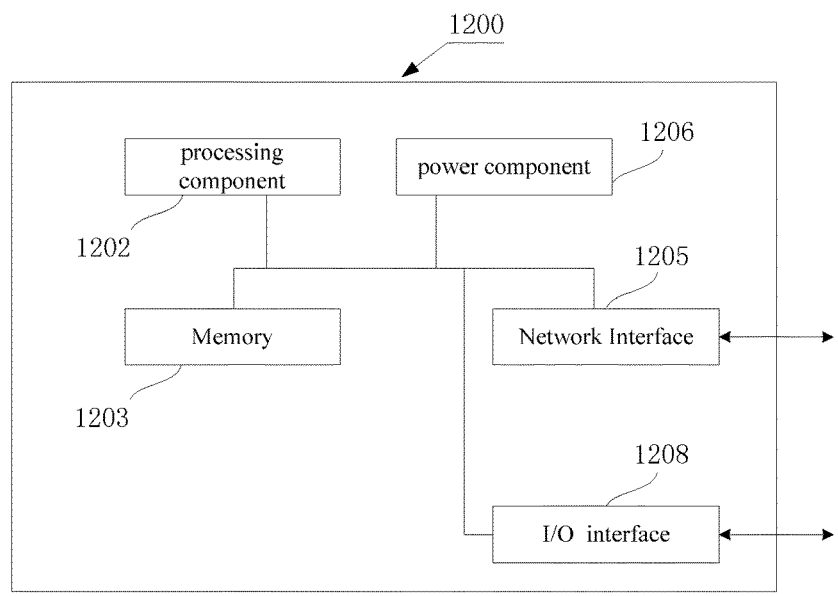
FIG. 12 is a block diagram of a data transmission device according to an embodiment.

FIG. 12 is a block diagram of a data transmission device according to an embodiment. For example, the data transmission device 1200 may be provided as a server. The data transmission device 1200 includes a processing component 1202, which further includes one or more processors, and a memory resource represented by a memory 1203 for storing instructions executable by the processing component 1202, such as application programs. The application program stored in the memory 1203 may include one or more modules each corresponding to a set of instructions. In addition, the processing component 1202 is configured to execute instructions to perform the above method.

The data transmission device 1200 may further include a power component 1206 configured to perform power management of the data transmission device 1200, a wired or wireless network interface 1205 configured to connect the data transmission device 1200 to the network, and an input and output (I/O) interface 1208. The data transmission device 1200 could operate based on an operating system stored in the memory 1203, such as Windows Server™, Mac OS X™, Unix™, Linux™, FreeBSD™ or the like.

The disclosure also provides a non-transitory computer-readable storage medium. The non-transitory computer-readable storage medium may be a ROM, a random access memory (RAM), a CD-ROM, a magnetic tape, a floppy disk and an optical data storage device. When the instructions in the storage medium are executed by the processor of the data transmission device 1100 or the data transmission device 1200, the data transmission device 1100 or the data transmission device 1200 executes the following methods.

The method includes: receiving a first resource allocation message sent by a network access device, in which the first resource allocation message includes a size of a first transmission sub-block, first indication information representing an available time-domain resource of a target time slot configured to send the first transmission sub-block, and second indication information representing a first time-domain resource configured to send a second transmission sub-block in the next time slot after the target time slot; dividing a target transmission block into the first transmission sub-block and a second transmission sub-block based on the size of the first transmission sub-block and a size of the target transmission block, in which a size of the second transmission sub-block is equal to a difference between the size of the target transmission block and the size of the first transmission sub-block; and sending the first transmission sub-block on the available time-domain resource of the target time slot, and sending the second transmission sub-block on the first time-domain resource configured to send the second transmission sub-block in the next time slot after the target time slot.

In an embodiment, the first indication information includes the first length and a number of a first start symbol of the available time-domain resource of the target time slot, and the second indication information includes the second length and a number of a second start symbol of the first time-domain resource configured to transmit the second transmission sub-block in the next time slot after the target time slot.

In an embodiment, the first indication information includes a first indicator value and determination information, and the second indication information includes a second indicator value. After receiving the first resource allocation message sent by the network access device, the method further includes: determining the first length and the number of the first start symbol of the available time-domain resource of the target time slot according to the first indicator value and the determination information; and determining the second length and the number of the second start symbol of the first time-domain resource configured to transmit the second transmission sub-block in the next time slot after the target time slot based on the second indicator value.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

The technical solution provided by embodiments of the disclosure may include the following beneficial effects. In this technical solution, when the available time-domain resource in the target time slot cannot satisfy burst transmission, the target transmission block is divided into the first transmission sub-block and the second transmission sub-block, in which the first transmission sub-block is sent on the available time-domain resource of the target time slot, and the second transmission sub-block is sent in the next time slot of the target time slot, so that the target transmission block does not need to be transmitted until the next time slot has a sufficient number of continuous symbols, which reduces waiting latency and transmission latency, thereby ensuring high service reliability and low latency, and improving service quality.

It should be understood that the disclosure is not limited to the precise structure that has been described above and shown in the drawings, and various modifications and changes are made without departing from its scope. The scope of the disclosure is only limited by the appended claims.

What is claimed is:

1. A data transmission method, applied to a network access device, comprising:
   determining a size of a first transmission sub-block sent on an available time-domain resource of a target time slot based on a first length of the available time-domain resource, a size of an available frequency-domain resource, and a modulation mode and a code rate used in physical layer resource mapping, when a target length of a time-domain resource required by a target transmission block is greater than the first length of the available time-domain resource of the target time slot;

dividing the target transmission block into the first transmission sub-block and a second transmission sub-block based on the size of the first transmission sub-block and a size of the target transmission block, wherein a second length of a time-domain resource required by the second transmission sub-block is equal to a difference between the target length and the first length;

determining a first time-domain resource of the second length for sending the second transmission sub-block in the next time slot after the target time slot based on the second length of the time-domain resource required by the second transmission sub-block; and sending a first resource allocation message to a terminal, wherein the first resource allocation message comprises the size of the first transmission sub-block, first indication information representing the available time-domain resource of the target time slot configured to send the first transmission sub-block, and second indication information of the first time-domain resource configured to send the second transmission sub-block in the next time slot after the target time slot.

2. The method of claim 1, wherein the first indication information comprises the first length and a number of a first start symbol of the available time-domain resource of the target time slot, and the second indication information comprises the second length and a number of a second start symbol of the first time-domain resource configured to transmit the second transmission sub-block in the next time slot after the target time slot.

3. The method of claim 1, wherein before sending the first resource allocation message to the terminal, the method further comprises:
   determining a first indicator value and determination information indicating whether the number of the first start symbol is greater than a preset value, according to the first length and the number of the first start symbol of the available time-domain resource of the target time slot;

determining a second indicator value according to the second length and the number of the second start symbol of the first time-domain resource configured to transmit the second sub-transmission block in the next time slot after the target time slot; wherein the first indication information comprises the first indicator value and the determination information, and the second indication information comprises the second indicator value.

4. The method of claim 1, further comprising:
   determining whether the target length of the time-domain resource required by the target transmission block is greater than the first length of the available time-domain resource of the target time slot;

determining a second time-domain resource for sending the target transmission block on the available time-domain resource of the target time slot, when the target length of the time-domain resource required by the target transmission block is greater than the first length of the available time-domain resource of the target time slot; and sending a second resource allocation message to the terminal, wherein the second resource allocation message comprises third indication information representing the second time-domain resource configured to send the target transmission block on the available time-domain resource of the target time slot.

5. A data transmission method, applied to a terminal, comprising:

receiving a first resource allocation message sent by a network access device, wherein the first resource allocation message comprises a size of a first transmission sub-block, first indication information representing an available time-domain resource of a target time slot configured to send the first transmission sub-block, and second indication information of a first time-domain resource configured to send a second transmission sub-block in the next time slot after the target time slot;

dividing a target transmission block into the first transmission sub-block and a second transmission sub-block based on the size of the first transmission sub-block and a size of the target transmission block, wherein a size of the second transmission sub-block is equal to a difference between the size of the target transmission block and the size of the first transmission sub-block; and sending the first transmission sub-block on the available time-domain resource of the target time slot, and sending the second transmission sub-block on the first time-domain resource configured to send the second transmission sub-block in the next time slot after the target time slot.

6. The method of claim 5, wherein the first indication information comprises a first length and a number of a first start symbol of the available time-domain resource of the target time slot, and the second indication information comprises a second length and a number of a second start symbol of the first time-domain resource configured to transmit the second transmission sub-block in the next time slot after the target time slot.

7. The method of claim 5, wherein the first indication information comprises a first indicator value and determination information, and the second indication information comprises a second indicator value; and after receiving the first resource allocation message sent by the network access device, the method further comprises:

determining the first length and the number of the first start symbol of the available time-domain resource of the target time slot according to the first indicator value and the determination information; and determining the second length and a number of the second start symbol of the first time-domain resource configured to transmit the second transmission sub-block in the next time slot after the target time slot based on the second indicator value.

8. A data transmission device, implementing the method of claim 1, comprising:
a processor; and
a memory configured to store instructions executable by the processor; wherein
the processor is configured to perform steps of the method of claim 1.

9. A data transmission device, comprising:
a processor;
a memory configured to store executable instructions of the processor; wherein
the processor is configured to:
receive a first resource allocation message sent by a network access device, wherein the first resource allocation message comprises a size of a first transmission sub-block, first indication information representing an available time-domain resource of a target time slot configured to send the first transmission sub-block, and second indication information of a first time-domain resource configured to send a second transmission sub-block in the next time slot after the target time slot;

divide a target transmission block into the first transmission sub-block and a second transmission sub-block based on the size of the first transmission sub-block and a size of the target transmission block, wherein a size of the second transmission sub-block is equal to a difference between the size of the target transmission block and the size of the first transmission sub-block; and send the first transmission sub-block on the available time-domain resource of the target time slot, and send the second transmission sub-block on the first time-domain resource configured to send the second transmission sub-block in the next time slot after the target time slot.

10. The device of claim 9, wherein the first indication information comprises a first length and a number of a first start symbol of the available time-domain resource of the target time slot, and the second indication information comprises a second length and a number of a second start symbol of the first time-domain resource configured to transmit the second transmission sub-block in the next time slot after the target time slot.

11. The device of claim 9, wherein the first indication information comprises a first indicator value and determination information, and the second indication information comprises a second indicator value; and after receiving the first resource allocation message sent by the network access device, the processor is further configured to:

determine the first length and the number of the first start symbol of the available time-domain resource of the target time slot according to the first indicator value and the determination information; and determine the second length and a number of the second start symbol of the first time-domain resource configured to transmit the second transmission sub-block in the next time slot after the target time slot based on the second indicator value.

* * * * *